(12) United States Patent
Keller et al.

(10) Patent No.: US 8,221,000 B2
(45) Date of Patent: Jul. 17, 2012

(54) BEARING FOR ROLLING MILL ROLL

(75) Inventors: Karl Keller, Hilchenbach (DE); Konrad Roeingh, Hilchenbach (DE); Kurt Scheffe, Hilchenbach (DE)

(73) Assignee: SMS Siemag Aktiengesellschaft, Düsseldorf (DE)

( * ) Notice: Subject to any disclaimer, the term of this patent is extended or adjusted under 35 U.S.C. 154(b) by 626 days.

(21) Appl. No.: 12/227,540

(22) PCT Filed: Feb. 27, 2007

(86) PCT No.: PCT/EP2007/001655
§ 371 (c)(1),
(2), (4) Date: Nov. 20, 2008

(87) PCT Pub. No.: WO2007/134655
PCT Pub. Date: Nov. 29, 2007

(65) Prior Publication Data
US 2009/0116774 A1    May 7, 2009

(30) Foreign Application Priority Data
May 22, 2006  (DE) .................. 10 2006 024 136

(51) Int. Cl.
*F16C 21/00* (2006.01)
*F16C 33/02* (2006.01)
(52) U.S. Cl. .................. 384/126; 384/276; 384/295
(58) Field of Classification Search .................. 384/126, 384/244, 256, 275, 276, 295, 559, 584, 586, 384/127
See application file for complete search history.

(56) References Cited

U.S. PATENT DOCUMENTS

| 2,018,055 | A | * | 10/1935 | Dahlstrom | .................... 384/419 |
| 2,245,084 | A |  | 6/1941 | Wood |  |
| 4,351,576 | A |  | 9/1982 | Nishide et al. |  |
| 4,372,626 | A |  | 2/1983 | Petros |  |
| 6,149,309 | A | * | 11/2000 | Wojtkowski et al. | ......... 384/276 |
| 6,575,638 | B2 | * | 6/2003 | Martins et al. | ................ 384/584 |

FOREIGN PATENT DOCUMENTS

| DE | 26 12 744 | 10/1976 |
| FR | 2 676 943 | 12/1992 |
| GB | 2 060 133 | 4/1981 |
| GB | 2 079 895 | 1/1982 |
| WO | 2007/121806 | 11/2007 |

OTHER PUBLICATIONS

Translation of FR2676943 obtained on Aug. 29, 2011.*

* cited by examiner

*Primary Examiner* — James Pilkington
(74) *Attorney, Agent, or Firm* — Lucas & Mercanti, LLP; Klaus P. Stoffel

(57) ABSTRACT

A bearing for a rolling mill roll that has a roll neck, the bearing including a neck sleeve fitted onto the roll neck, a chock, a bearing bush supported in the chock, and a load-bearing lubricating film provided between the neck sleeve and the bearing bush. The roll neck has a step at a transition to an undercut region that defines part of a keyway groove in an axial end face of the roll neck, a remaining part of the keyway groove being formed in an axial end of the neck sleeve. A feather key is provided in the keyway groove. The feather key and the keyway groove are arranged adjacent to, without passing through, a Rötscher line extending between the step of the roll neck and an outer axial edge of the bearing bush. The feather key has a radial extension that is greater than an axial extension.

2 Claims, 1 Drawing Sheet

BEARING FOR ROLLING MILL ROLL

BACKGROUND OF THE INVENTION

The invention concerns bearings for rolling mill rolls, which have two roll necks each, at least one of which carries a neck sleeve fitted onto it at least in a certain region in the axial direction, with rotation being prevented by a feather key, where the neck sleeve is enclosed by a bearing bush supported in a chock, and a load-bearing lubricating film is provided between the neck sleeve and the bearing bush, and where the feather key is provided in a region of the roll neck that is located outside the region of the rolling force that acts on the neck sleeve and is transferred to the chock.

Plain bearings for rolling mill rolls have long been known. Previous plain bearings carried feather keys between the neck sleeve and the roll neck. However, these feather keys led to fluctuations in the rolling force during the rolling operation. It was possible for these rolls to be constructed short due to the fact that the feather keys were located in the region of the force-absorbing neck sleeve. As a result, the rolling stands were narrow. This made it possible to construct small foundations for the rolling stands, the mill halls, and the roll workshops.

However, to eliminate fluctuations in the rolling force, the generic patent application DE 26 12 744 A1 proposes that the feather keys be placed outside of the area of the rolling force acting upon the neck sleeve. This resulted in an increase in the length of the rolls. This in turn resulted in wider foundations, wider mill halls, and wider roll workshops.

SUMMARY OF THE INVENTION

The objective of the invention is to create bearings for rolling mill rolls, in which the fluctuations in rolling force caused by the feather key and its keyway groove are eliminated but which nevertheless can be constructed very short, so that significant savings are realized as a result of narrower foundations, narrower mill halls, and narrower roll workshops.

To achieve this objective, it is proposed that the feather key and its keyway groove be arranged as close as possible to the Rötscher line defining the outer region of the compressive force transmission and that the extension of the feather keys in the radial direction be greater than their extension in the axial direction.

The arrangement of the feather key and its keyway groove as close as possible to the Rötscher line results in a roll design that is as short as possible. If, in addition, the feather keys are mounted in such a way that they extend essentially in the radial direction, additional space is saved. These savings are realized at both ends of the roll, which results in narrower rolling stands, narrower foundations, narrower mill halls, and narrower roll workshops with no sacrifice of rolling quality.

It is advantageous if the feather key and its keyway groove border directly on the Rötscher line. This guarantees the smallest possible clearance and thus the shortest roll construction with high rolling quality without fluctuations in the rolling force.

BRIEF DESCRIPTION OF THE DRAWING

The single FIGURE is a cross-section of a roll neck showing the invention.

DETAILED DESCRIPTION OF THE INVENTION

Figure 1:
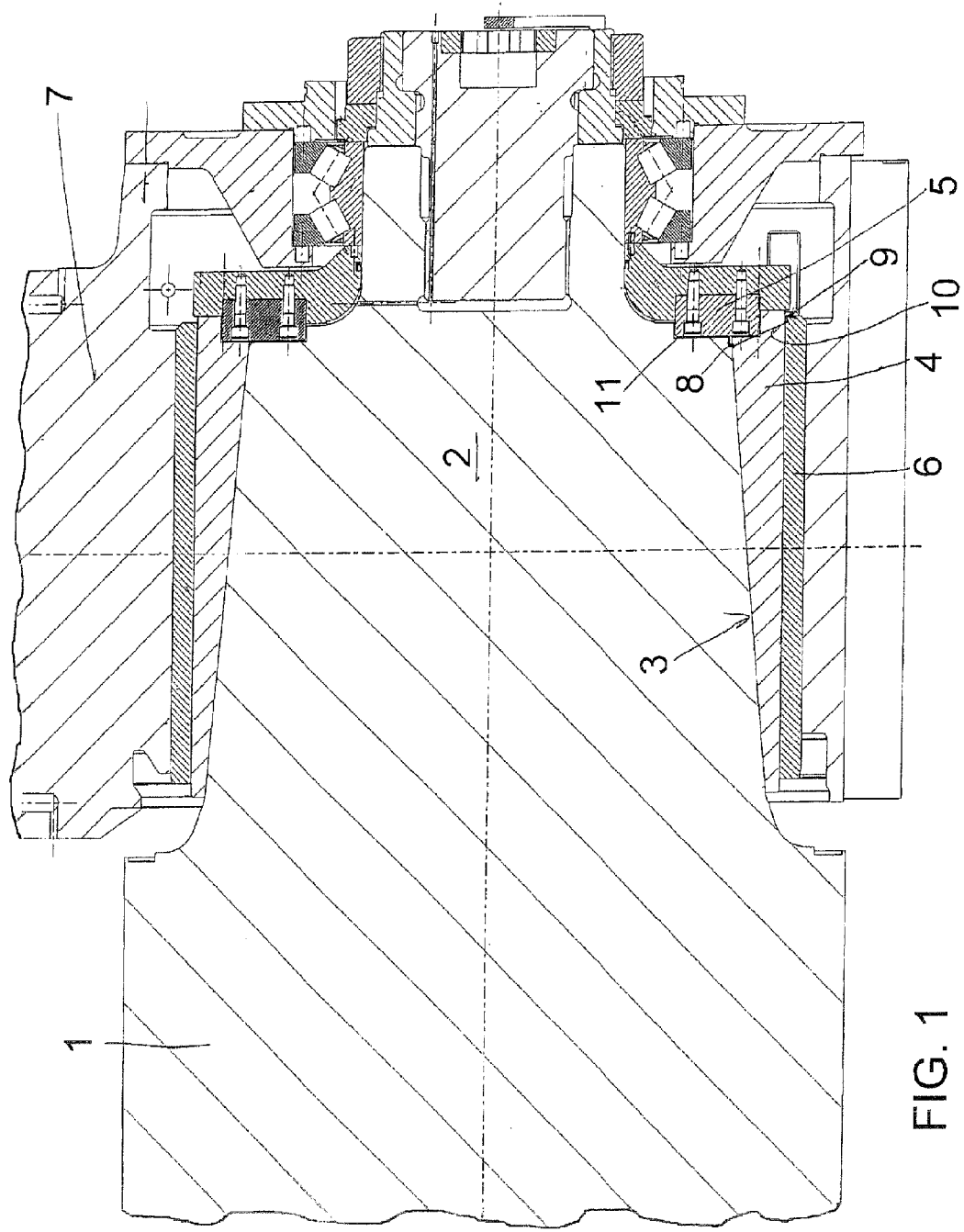

The invention is explained in greater detail below with reference to the accompanying drawing, which shows a roll 1 with a roll neck 2, which in the present case has a conical region 3. Naturally, instead of the conical region 3, a cylindrical region is possible.

A neck sleeve 4 is seated on the roll neck 2. It is prevented from rotating relative to the roll neck 2 by a feather key 5, which fits into both the roll neck 2 and the neck sleeve 4. The neck sleeve 4 is enclosed by a bearing bush 6, which is supported in a chock 7.

At a step 8, the conical roll neck 2 makes a transition to an undercut region. The neck sleeve 4 is no longer supported by the roll neck 2 in this region. The Rötscher line 10, which is defined as the outermost force transmission line, is shown here running from the step 8 to the outer edge 9 of the bearing bush 6. It is readily apparent that the forces can flow from the roll neck 2 through the neck sleeve 4 to the bearing bush 5 and from there to the chock 7, unhindered and uninterrupted by the feather key 5. The feather key 5 and its keyway groove 11 only touch the Rötscher line, so that no fluctuations in the rolling force can arise. In other words, the feather key 5 is arranged just close enough to the roll neck 2 so that no fluctuations in the rolling force can arise.

The drawing additionally shows that the feather key 5 extends essentially in the radial direction. In this way, the axial dimension of the feather key 5 in front of the roll neck 2 is as small as possible, so that the roll neck as a whole can be constructed very short.

LIST OF REFERENCE NUMBERS 1 roll
2 roll neck
3 conical region
4 neck sleeve
5 feather key
6 bearing bush
7 chock
8 step
9 outer edge
10 Rötscher line
11 keyway groove

The invention claimed is:

1. A bearing for a rolling mill roll that has two roll necks (2), the bearing comprising: a neck sleeve (4) fitted onto at least one of the roll necks in a region in an axial direction of the roll; a chock (7); a bearing bush (6) supported in the chock so as to enclose the neck sleeve (4), and a load-bearing lubricating film being provided between the neck sleeve (4) and the bearing bush (6), the roll neck having a step (8) at a transition to an undercut region that defines part of a keyway groove (11) in an axial end face of the roll neck, a remaining part of the keyway groove being formed in an axial end of the neck sleeve (4); and a feather key (5) provided in the keyway groove in a region of the roll neck (2) located outside of a region of rolling force that acts on the neck sleeve (4) and is transferred to the chock (7), wherein the feather key (5) and the keyway groove (11) are arranged adjacent to without passing through a Rötscher line (10) extending between the step of the roll neck and an outer axial edge of the bearing bush (9) and defining an outer region of a compressive force transmission, wherein the feather key (5) has an extension in a radial direction that is greater than an extension of the feather key in the axial direction.

2. A bearing in accordance with claim 1, wherein the feather key (4) and the keyway groove (11) border directly on the Rötscher line (10).

* * * * *